(12) United States Patent
Mouly et al.

(10) Patent No.: US 11,867,259 B2
(45) Date of Patent: Jan. 9, 2024

(54) MECHANICAL GEARBOX FOR AN AIRCRAFT TURBOMACHINE

(71) Applicant: SAFRAN TRANSMISSION SYSTEMS, Colombes (FR)

(72) Inventors: Guillaume Pierre Mouly, Moissy-Cramayel (FR); Adrien Louis Simon, Moissy-Cramayel (FR); Dhafer Ghribi, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/453,607

(22) Filed: Nov. 4, 2021

(65) Prior Publication Data

US 2022/0145769 A1 May 12, 2022

(30) Foreign Application Priority Data

Nov. 10, 2020 (FR) ...................................... 2011537

(51) Int. Cl.
*F16H 1/28* (2006.01)
*F02C 7/36* (2006.01)

(52) U.S. Cl.
CPC .................. *F16H 1/28* (2013.01); *F02C 7/36* (2013.01); *F05D 2260/40311* (2013.01); *F16H 2001/289* (2013.01); *F16H 2001/2872* (2013.01)

(58) Field of Classification Search
CPC ....... F16H 2001/289; F16H 2001/2872; F02C 7/36
See application file for complete search history.

(56) References Cited

U.S. PATENT DOCUMENTS

| 3,307,433 A | 3/1967 | Bennett |
| 10,145,259 B2 * | 12/2018 | Sheridan ............... F16H 1/2827 |
| 2013/0225353 A1 | 8/2013 | Gallet et al. |

FOREIGN PATENT DOCUMENTS

| EP | 3726031 A1 | 10/2020 |
| FR | 2928976 A1 | 9/2009 |
| FR | 2987416 A1 | 8/2013 |
| FR | 3008462 A1 | 1/2015 |
| FR | 3008463 A1 | 1/2015 |
| FR | 3041054 A1 | 3/2017 |
| WO | 2010/092263 A1 | 8/2010 |

OTHER PUBLICATIONS

Preliminary Research Report received for French Application No. 2011537, dated Jul. 5, 2021, 3 pages (1 page of French Translation Cover Sheet and 2 pages of original document).

* cited by examiner

*Primary Examiner* — Erin D Bishop
(74) *Attorney, Agent, or Firm* — WOMBLE BOND DICKINSON (US) LLP

(57) ABSTRACT

A mechanical gearbox for turbomachine, in particular for aircraft. The gearbox includes a sun gear including an external toothing, a ring gear including an internal toothing, and planet gears which are meshed with the sun gear and the stationary ring gear. The planet gears are carried by a movable planet carrier and each having external toothings of different diameters. The movable planet carrier includes a movable ring gear which carries an internal toothing and which is independent of the stationary ring gear, each of the planet gears being meshed with the sun gear and the stationary and movable ring gears.

12 Claims, 14 Drawing Sheets

[Fig.3]
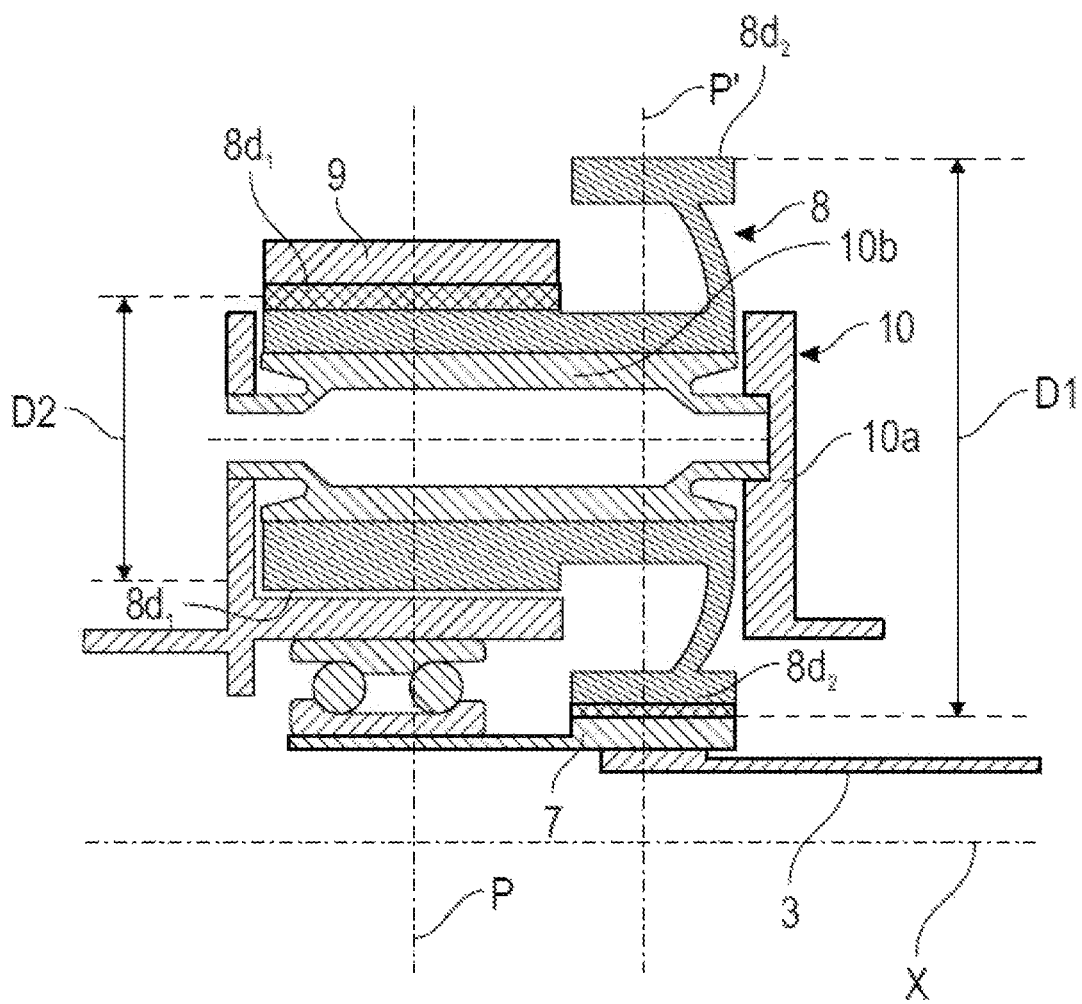

[Fig.4]
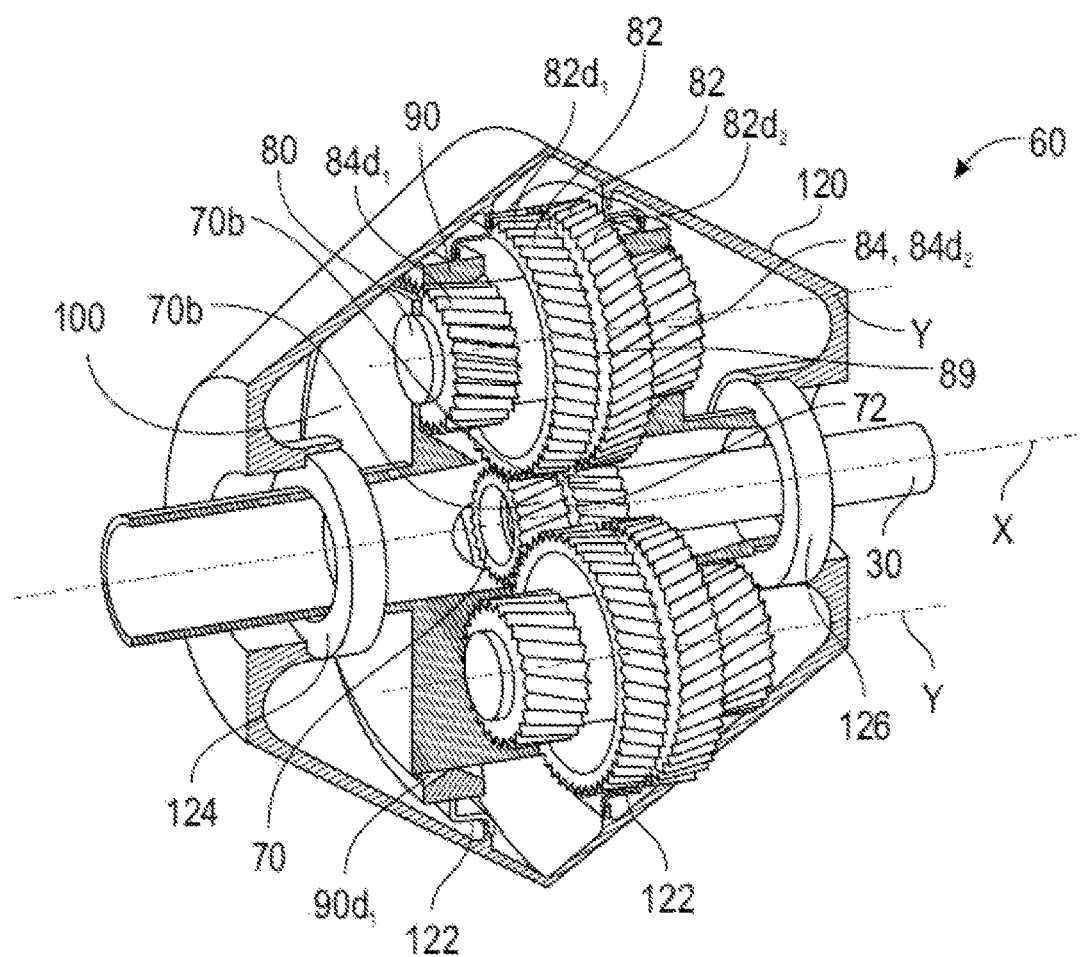

[Fig.5]
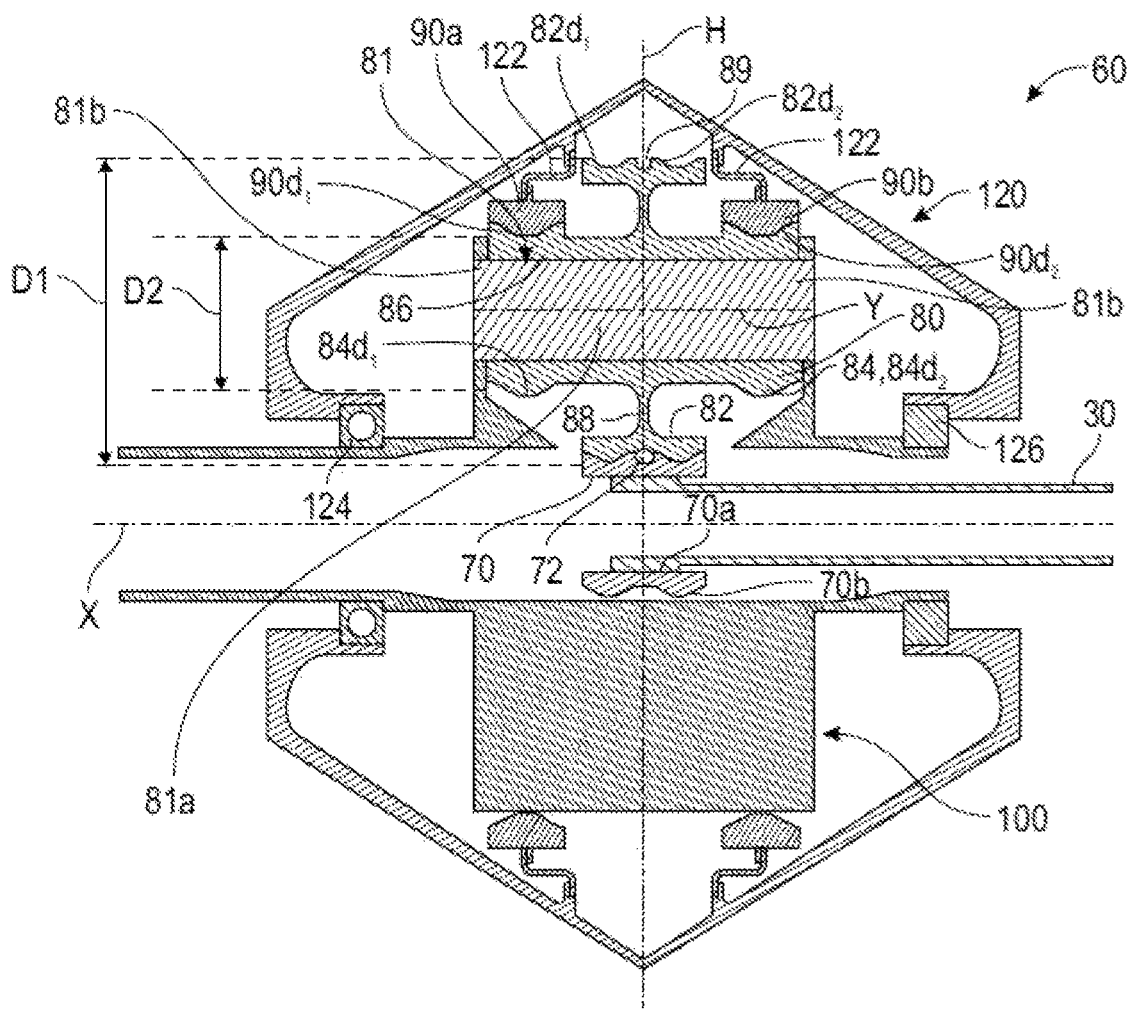

[Fig.6]
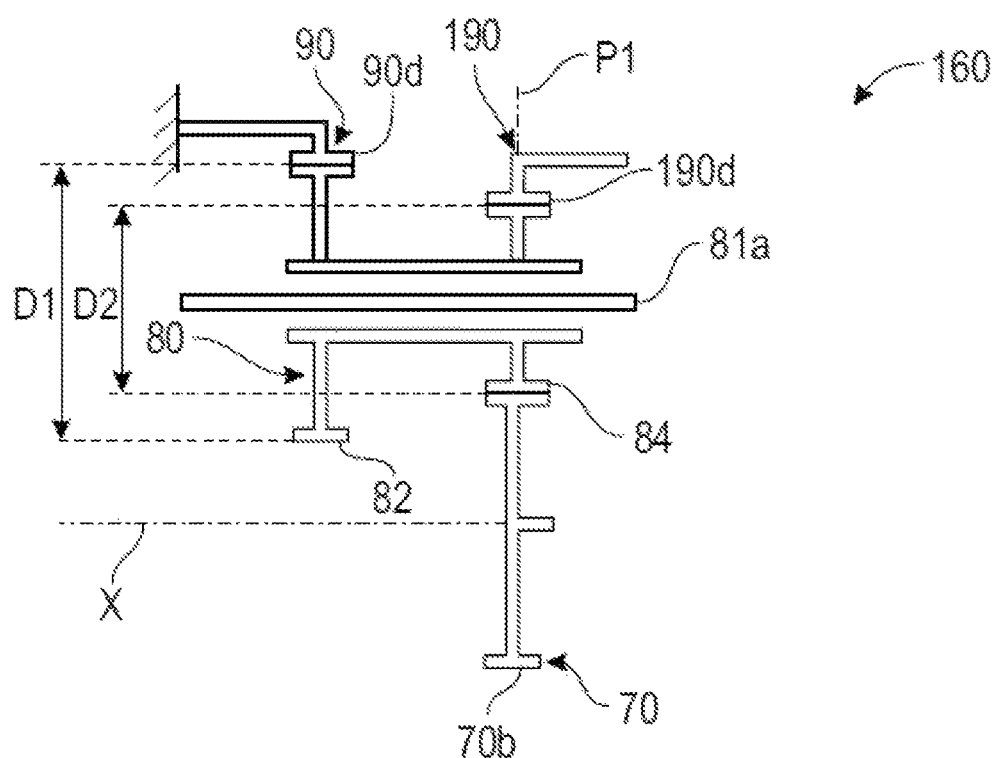

[Fig.7]
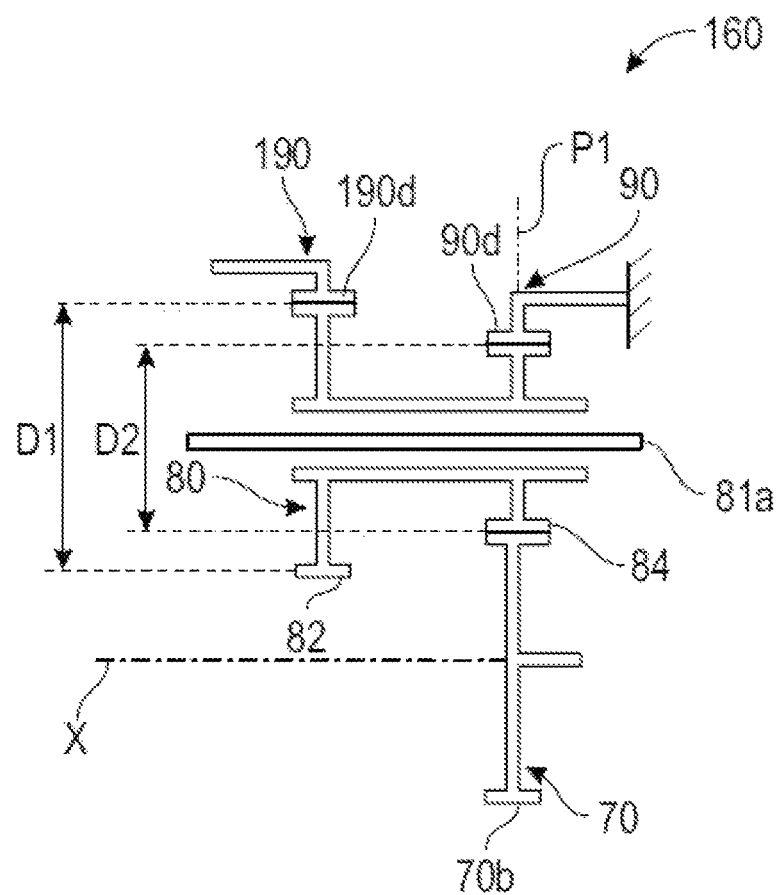

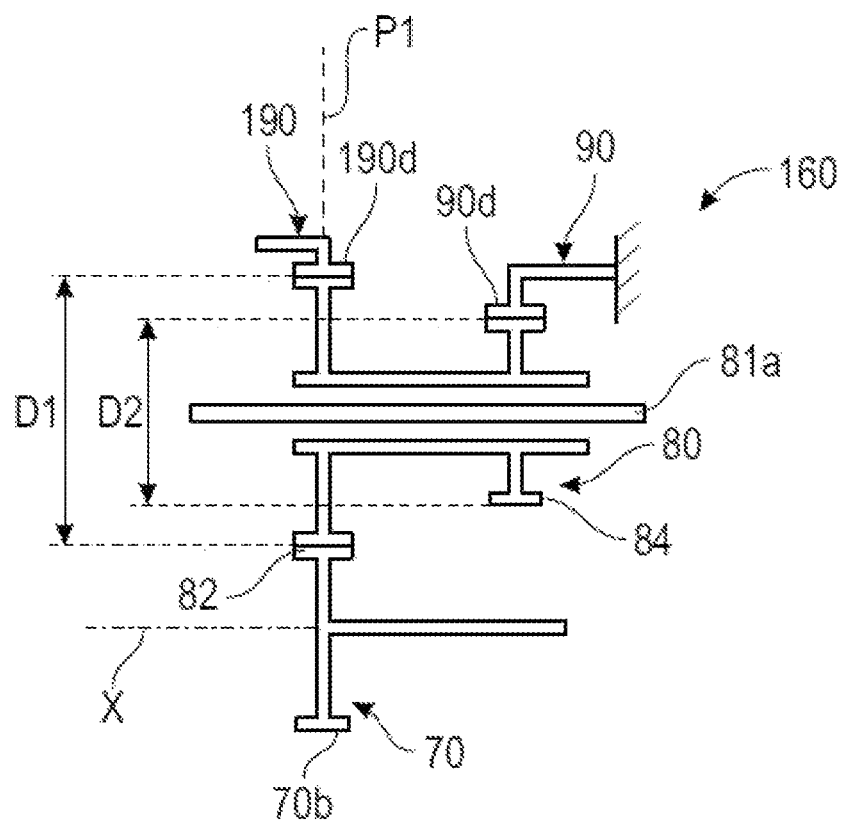
[Fig.8]

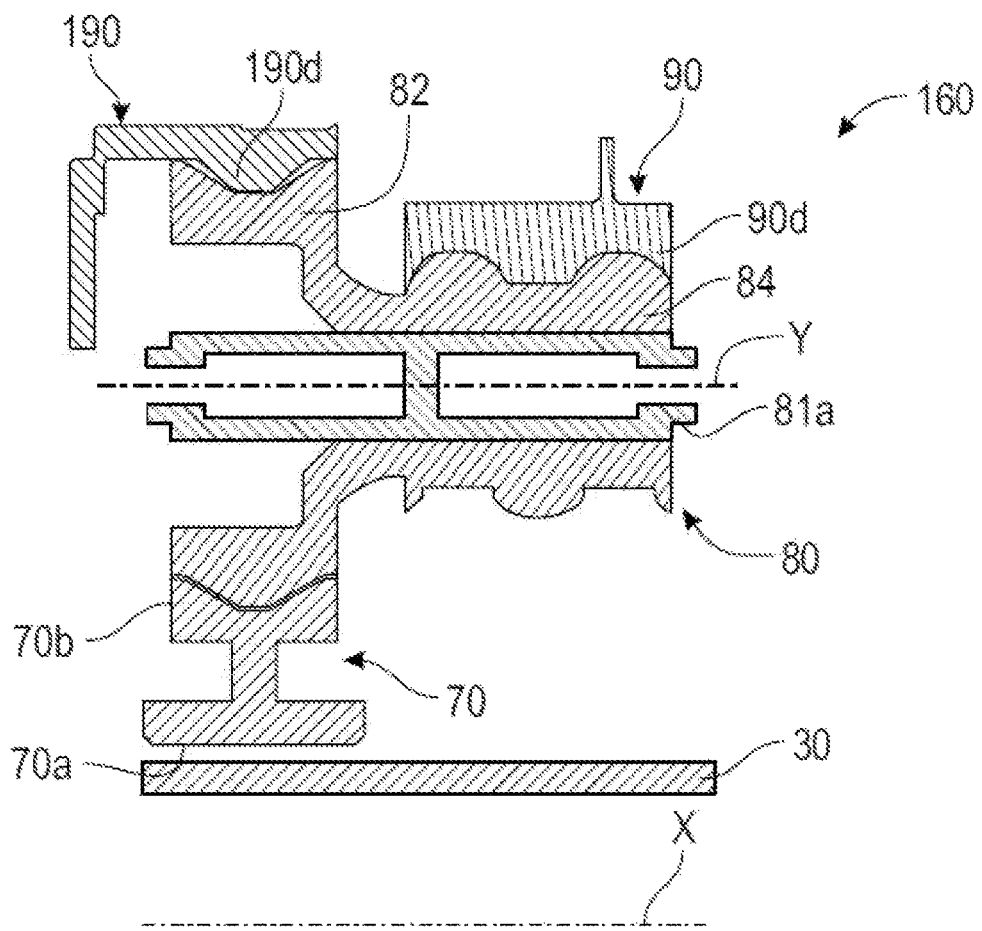
[Fig.9]

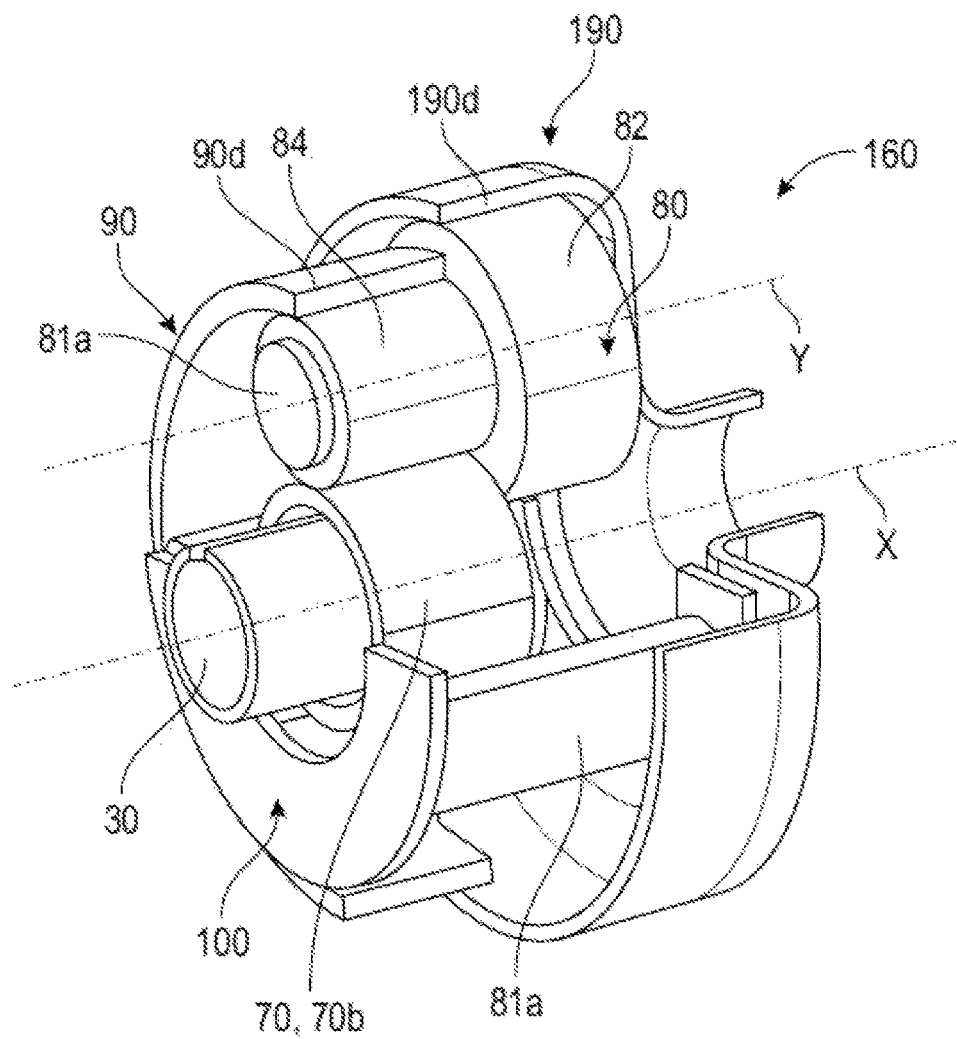
[Fig.10]

[Fig.11]
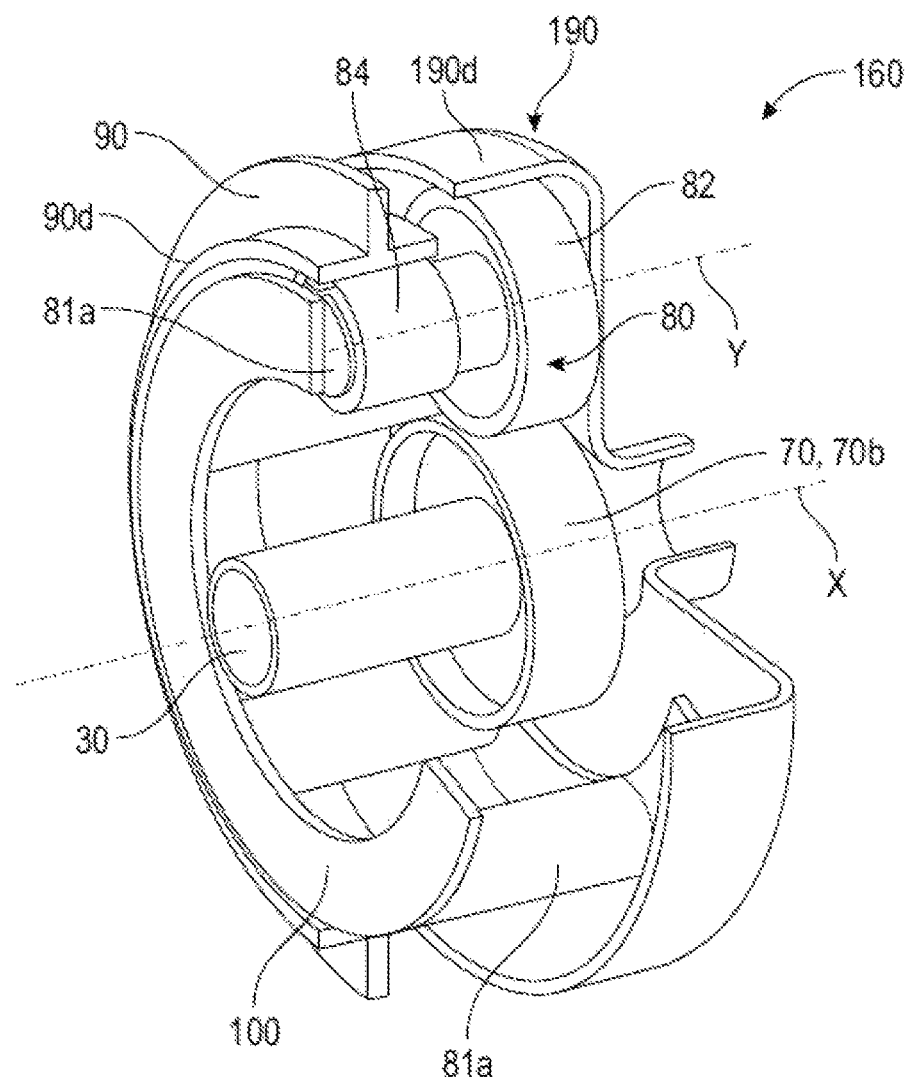

[Fig.12]
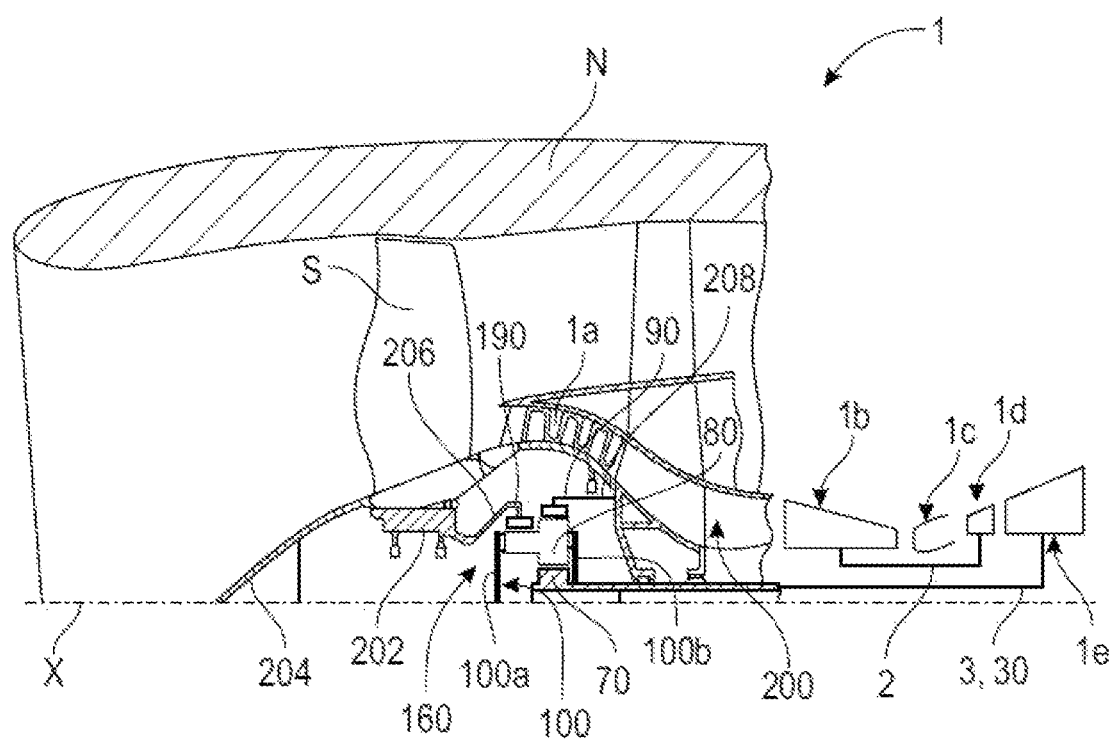

[Fig.13]
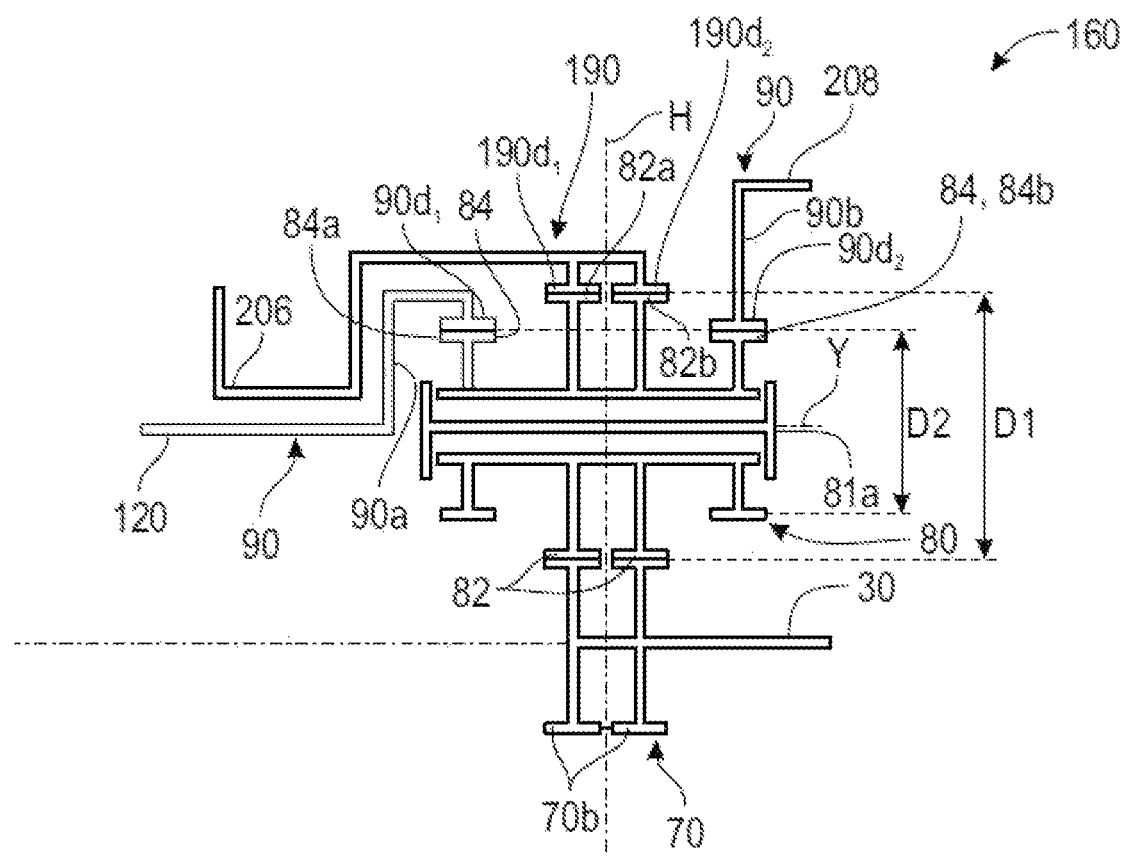

[Fig.14]
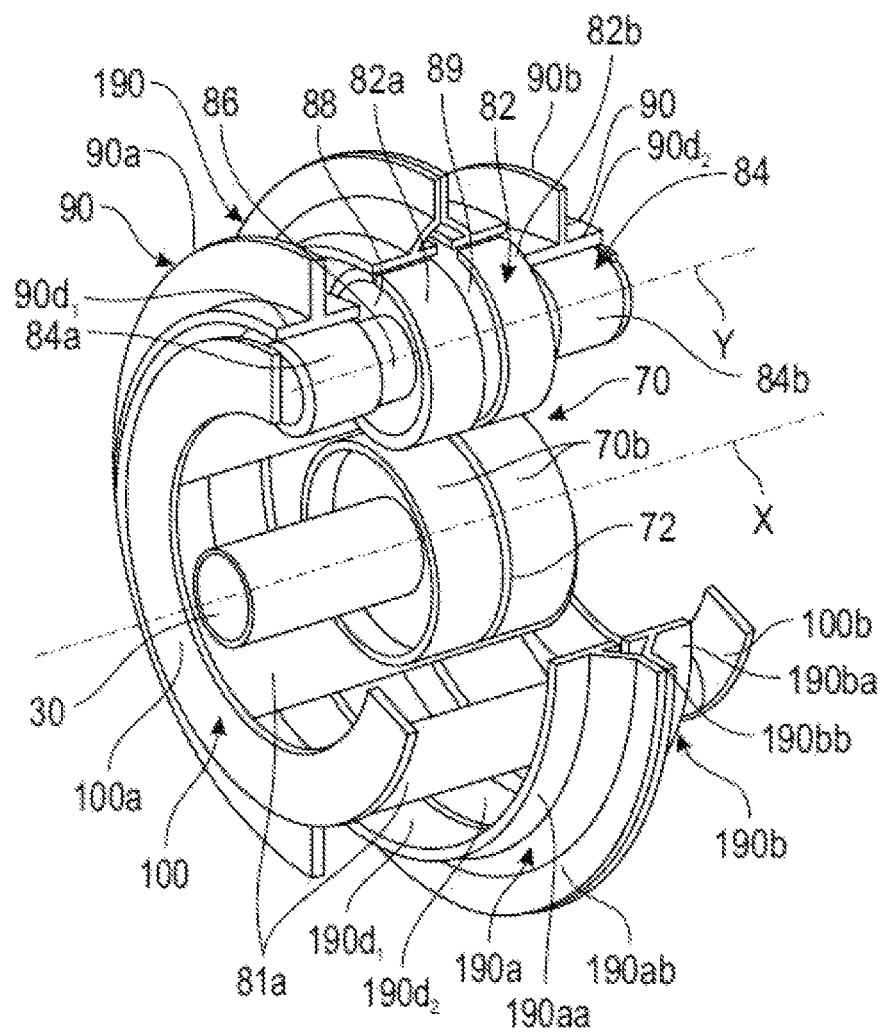

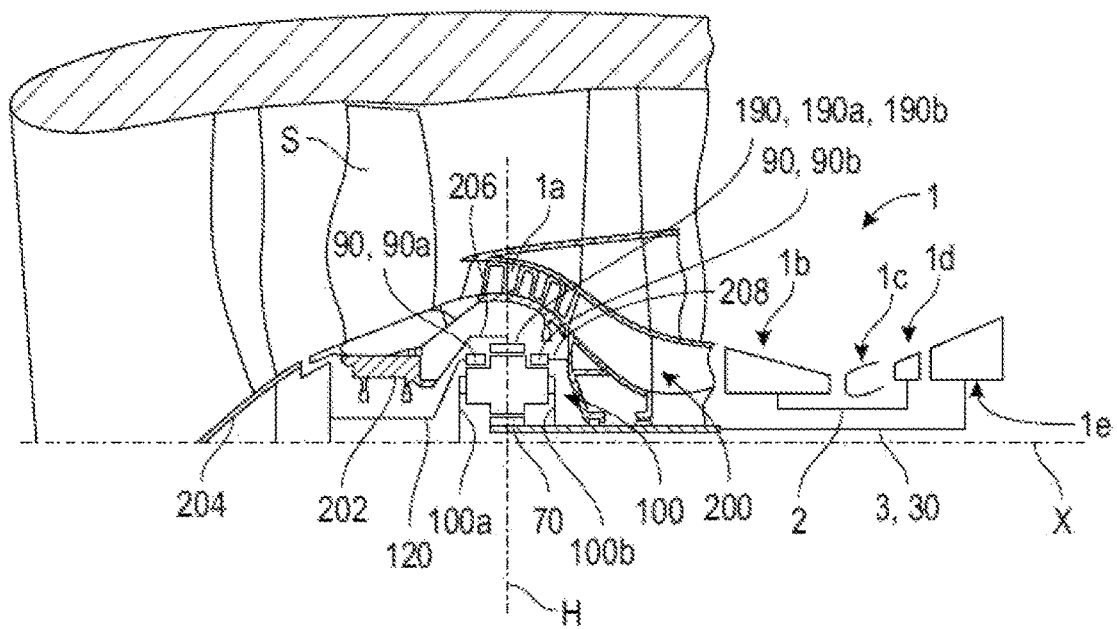
[Fig.15]

MECHANICAL GEARBOX FOR AN AIRCRAFT TURBOMACHINE

TECHNICAL FIELD OF THE INVENTION

The present invention relates to the field of mechanical gearboxes for turbomachines, in particular for aircraft.

BACKGROUND

The prior art comprises in particular the documents WO-A1-2010/092263, FR-A1-2 987 416, FR-A1-3 008 462, FR-A1-3 008 463, FR-A1-2 928 976, EP-A1-3 726 031, U.S. Pat. No. 3,307,433 and FR-A1-3 041 054.

The role of a mechanical gearbox is to modify the speed and torque ratio between the input axle and the output axle of a mechanical system.

The new generations of double-flow turbomachines, in particular those with a high dilution ratio, comprise a mechanical gearbox to drive the shaft of a fan. The usual purpose of the gearbox is to convert the so-called high speed of the shaft of a power turbine into a slower speed for the shaft driving the fan.

Such a gearbox comprises a central pinion, called sun gear, a ring gear and pinions called planet gears, which are engaged between the sun gear and the ring gear. The planet gears are held by a frame called a planet carrier. The sun gear, the ring gear and the planet carrier are planetary gears because their axes of revolution coincide with the longitudinal axis X of the turbomachine. The planet gears each have a different axis of revolution equally distributed on the same operating diameter around the axis of the planetary gears. These axes are parallel to the longitudinal axis X.

There are several gearbox architectures. In the prior art of the double-flow turbomachines, the gearboxes are of the planetary or epicyclic type. In other similar applications, there are architectures referred to as differential or "compound".

In a planetary gearbox, the planet carrier is stationary and the ring gear is the output shaft of the device which rotates in the opposite direction to the sun gear.

In an epicyclic gearbox, the ring gear is stationary and the planet carrier is the output shaft of the device which rotates in the same direction as the sun gear.

On a compound gearbox, no element is attached in rotation. The ring gear rotates in the opposite direction of the sun gear and the planet carrier.

The gearboxes can consist of one or more gearing stages. This meshing is ensured in different ways such as by contact, friction or magnetic field.

In the present application, "stage" or "toothing" means at least one series of meshing teeth with at least one series of complementary teeth. A toothing can be internal or external.

A planet gear may comprise one or two gearing stages. A single-stage planet gear comprises a toothing that can be straight, helical or herringbone, and whose teeth are located on a same diameter. This toothing cooperates with both the sun gear and the ring gear.

A double-stage planet gear comprises two toothings that are located on different diameters. A first toothing cooperates with the sun gear and a second toothing generally cooperates with the ring gear.

A gearbox with a dual-stage gearing has the advantage of having a higher reduction ratio than a gearbox with a single gearing stage of the same overall dimensions.

The invention provides an improvement allowing to further increase the reduction ratio of an aircraft turbomachine mechanical gearbox.

SUMMARY OF THE INVENTION

The invention relates to a mechanical gearbox for a turbomachine, in particular for an aircraft, this gearbox comprising:
a sun gear which is rotatable about an axis and comprising an external toothing comprising two series of adjacent teeth,
a stationary ring gear which extends around the axis and which carries an internal toothing comprising two series of teeth, this stationary ring gear being configured to be secured to a stator of the turbomachine, and
planet gears which are meshed with the sun gear and the stationary ring gear, the planet gears being carried by a planet carrier which is rotatable about the axis and each of the planet gears having a dual-stage gearing and comprising a first external toothing of mean diameter D1 and comprising two series of adjacent teeth, and a second external toothing of mean diameter D2, different from D1, and comprising two series of teeth, the two series of teeth of the first toothing of each of the planet gears being meshed with the two series of teeth of the toothing of the sun gear,
characterized in that it further comprises:
a movable ring gear which extends around the axis and which carries an internal toothing with two series of adjacent teeth, this movable ring gear being independent of the stationary ring gear and being configured so as to be secured to a rotor of the turbomachine, each of the planet gears being meshed with the sun gear and the stationary and movable ring gears,
in that all the series of teeth are arranged symmetrically with respect to a median plane perpendicular to the axis,
and in that the movable ring gear comprises two half ring gears secured to each other and respectively carrying the two series of teeth, these two series of teeth being meshed with the two series of teeth of the first toothing of each of the planet gears, and the stationary ring gear comprising two annulus arranged on each side of the movable ring gear and respectively carrying the two series of teeth, these two series of teeth being meshed with the two series of teeth of the second toothing of each of the planet gears.

The invention thus proposes a gearbox with two independent ring gears and having different functions. One of the ring gears is stationary and the other of the ring gears is rotatable. It is therefore understood that the output ring gear forms a (torque) output of the gearbox, the input of the gearbox being formed by the sun gear. The planet carrier is also rotatable. It can be free to rotate and therefore independent of any rotor of the turbomachine. Alternatively, it could also be connected to a rotor of the turbomachine, different from the rotor connected to the ring gear.

The invention is intended for a dual-stage gearing gearbox as mentioned above. It is compatible with any type of toothing (straight, helical, herringbone, etc.). The invention is further compatible with a planet carrier of the one-piece type or of the cage and cage carrier type. These different types of gearbox are well known to the person skilled in the art.

The gearbox according to the invention may comprise one or more of the following characteristics, taken alone or in combination with each other:

each of the planet gears is meshed by its first toothing with the toothing of the sun gear and the toothing of the stationary ring gear, and by its second toothing with the toothing of the movable ring gear;

each of the planet gears is meshed by its first toothing with the toothing of the sun gear and the toothing of the movable ring gear, and by its second toothing with the toothing of the stationary ring gear;

the sun gear is coupled to a shaft or is integral with a shaft, the planet gears being arrangeable around at least a part of this shaft;

the toothing of the stationary and movable ring gears have the same number of teeth;

the toothing of the stationary and movable ring gears have different numbers of teeth;

all the toothings are selected from straight, helical or herringbone toothing;

the diameter D2 of the second toothing is smaller than the diameter D1 of the first toothing.

The invention also relates to a turbomachine, in particular of an aircraft, comprising a mechanical gearbox as described above.

The gearbox according to the invention may comprise one or more of the following characteristics, taken alone or in combination with each other:

the stationary ring gear is secured to at least one stator element;

the movable ring gear is secured to a fan rotor;

the planet carrier is mounted free to rotate;

one of the annulus of the stationary ring gear is secured to a stator element located downstream of the gearbox, such as a stator casing and for example an intermediate casing, and the other of the annulus of the stationary ring gear is secured to a stator element located upstream of the gearbox, such as an air inlet cone.

BRIEF DESCRIPTION OF FIGURES

Further characteristics and advantages will be apparent from the following description of a non-limiting embodiment of the invention with reference to the appended drawings in which:

FIG. 3 is another partial axial sectional view of a mechanical gearbox, and illustrates the prior art of the present invention, FIG. 4 is a schematic axial cross-sectional and perspective view of a symmetrical dual-stage gearing gearbox, and also illustrates the prior art of the present invention, FIG. 5 is another schematic axial section view of the gearbox of FIG. 4;

FIG. 6 is a very schematic partial view of a gearbox in axial section,

FIG. 7 is similar to FIG. 6 and shows another gearbox;

FIG. 8 is similar to FIG. 6 and shows another gearbox;

FIG. 9 is a partial schematic view in axial section of a gearbox of the type shown in FIG. 8;

FIG. 10 is a partial schematic view in axial section of a gearbox of the type shown in FIG. 7;

FIG. 11 is a partial schematic view in axial section of a gearbox of the type shown in FIG. 8;

FIG. 12 is a partial schematic view in axial section of a turbomachine equipped with a gearbox, such as one of those of FIGS. 6 to 11;

FIG. 13 is a view similar to FIG. 6 and illustrates an embodiment of the gearbox according to the invention;

FIG. 14 is a schematic partial axial section view of a gearbox according to the embodiment of FIG. 13; and FIG. 15 is a partial schematic view in axial section of a turbomachine equipped with a gearbox according to the invention, such as that of FIG. 13 or 14.

DETAILED DESCRIPTION OF THE INVENTION

Figure 1:
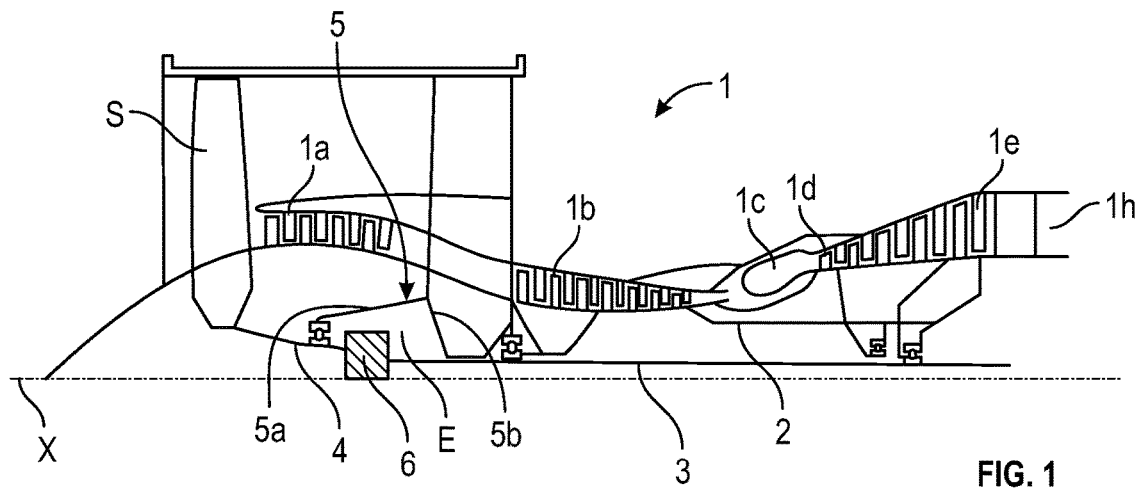
FIG. 1 is a schematic axial sectional view of a turbomachine using the invention.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is driven by the LP shaft 3 by means of a gearbox 6. This gearbox 6 is generally of the planetary or epicyclic type.

The following description relates to a gearbox of the epicyclic type, in which the planet carrier and the sun gear are rotatable, the ring gear of the gearbox being stationary in the reference frame of the engine.

The gearbox 6 is positioned in the upstream part of the turbomachine. A stationary structure comprising schematically, here, an upstream part 5a and a downstream part 5b which makes up the engine casing or stator 5 is arranged so as to form an enclosure E surrounding the gearbox 6. This enclosure E is closed upstream by seals at the level of a bearing allowing the passage of the fan shaft 4, and downstream by seals at the level of the passage of the LP shaft 3.

Figure 2:
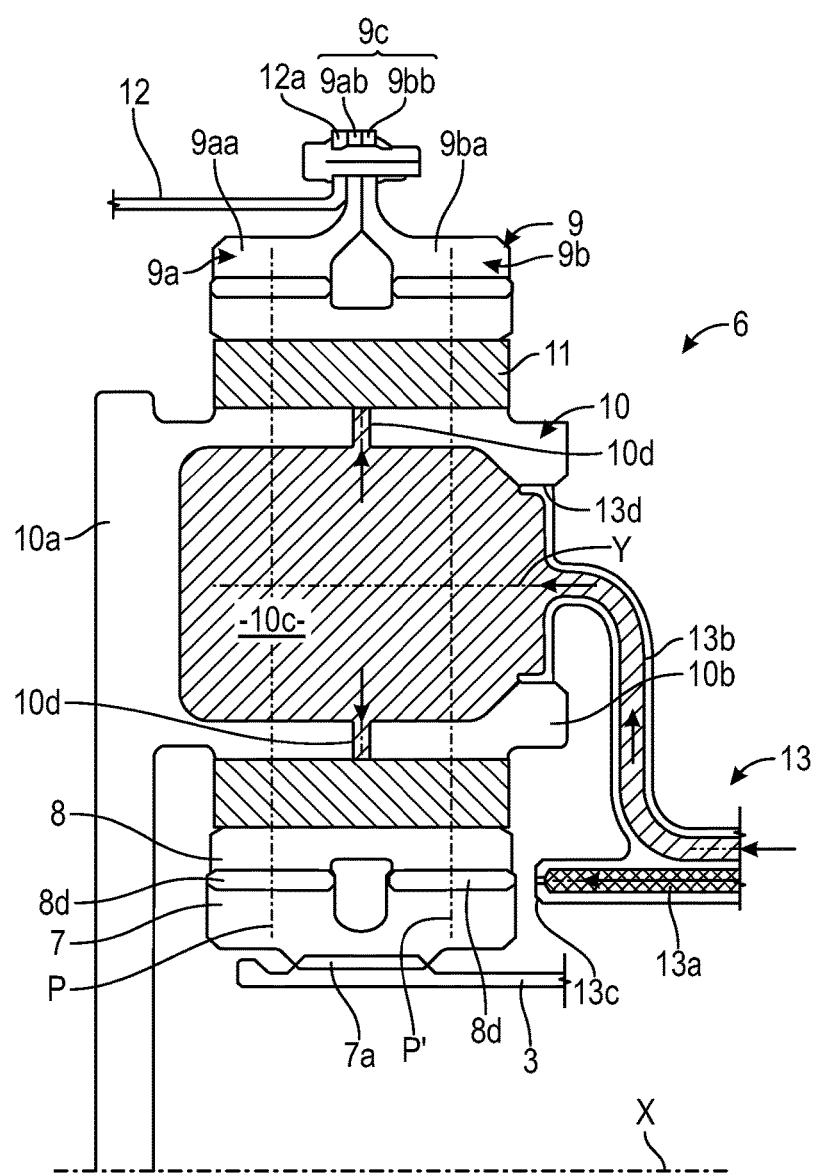
FIG. 2 is a partial axial sectional view of a mechanical gearbox.

FIG. 2 shows an epicyclic gearbox 6. The input of the gearbox 6 is connected to the LP shaft 3, for example by means of internal splines 7a. Thus the LP shaft 3 drives a planetary pinion called the sun gear 7. Classically, the sun gear 7, whose axis of rotation is coincident with that of the turbomachine X, drives a series of pinions called planet gears 8, which are equally distributed on the same diameter around the axis of rotation X. This diameter is equal to twice the operating center distance between the sun gear 7 and the planet gears 8. The number of planet gears 8 is generally defined between three and seven for this type of application.

The set of planet gears 8 is held by a frame referred to as planet carrier 10. Each planet gear 8 rotates around its own axis Y, and meshes with the ring gear 9.

In the output we have:

In this epicyclic configuration, the set of planet gears 8 drives the planet carrier 10 in rotation about the axis X of the turbomachine. The ring gear is secured to the engine casing or stator 5 via a ring gear carrier 12 and the planet carrier 10 is secured to the fan shaft 4.

In another planetary configuration, the set of the planet gears 8 is held by a planet carrier 10 which is secured to the engine casing or stator 5. Each planet gear drives the ring gear which is fitted to the fan shaft 4 via a ring gear carrier 12.

In another differential configuration, the set of planet gears 8 is held by a planet carrier 10 which is connected to a first fan shaft 5. Each planet gear drives the ring gear which is fitted to a second counter-rotating fan shaft 4 via a ring gear carrier 12.

Each planet gear 8 is mounted free in rotation by means of a bearing 11, for example of the bearing or hydrodynamic bearing type. Each bearing 11 is mounted on one of the axles 10b of the planet carrier 10 and all axles are positioned relative to each other using one or more structural frames 10a of the planet carrier 10. There are a number of axles 10b and bearings 11 equal to the number of planet gears. For reasons of operation, assembly, manufacture, inspection, repair or replacement, the axles 10b and the frame 10a can be separated into several pieces.

For the same reasons mentioned above, the toothing of a planet gear can be separated into several helices or teeth each with a median plane P, P'. In our example, we detail the operation of a gearbox in which each planet gear comprises two series of herringbone teeth cooperating with a ring gear separated into two half ring gears:

- an upstream half ring gear 9a consisting of a rim 9aa and an attachment half-flange 9ab. On the rim 9aa is the front helix meshed with a helix of the toothing 8d of each planet gear 8. The helix of the toothing 8d also meshes with that of the sun gear 7.
- a downstream half ring gear 9b consisting of a rim 9ba and an attachment half-flange 9bb. On the rim 9ba is the rear helix meshed with a helix of the toothing 8d of each planet gear 8. The helix of the toothing 8d also meshes with that of the sun gear 7.

If the helix widths vary between the sun gear 7, the planet gears 8 and the ring gear 9 because of the toothing overlaps, they are all centred on a median plane P for the upstream teeth and on another median plane P' for the downstream teeth.

FIG. 2 thus illustrates the case of a single-stage gearbox, i.e. a same toothing 8d of each planet gear 8 cooperates with both the sun gear 7 and the ring gear 9. Even though the toothing 8d comprises two series of teeth, these teeth have the same mean diameter and form a single toothing called herringbone.

The attachment half-flange 9ab of the upstream half ring gear 9a and the attachment half-flange 9bb of the downstream half ring gear 9b form the attachment flange 9c of the ring gear. The ring gear 9 is secured to a ring gear carrier by assembling the attachment flange 9c of the ring gear and the attachment flange 12a of the ring gear carrier by means of a bolted mounting, for example.

The arrows in FIG. 2 describe the delivery of the oil in the gearbox 6. The oil enters the gearbox 6 from the stator part 5 into a distributor 13 by different means which will not be specified in this view because they are specific to one or more types of architecture. The distributor 13 comprises injectors 13a and arms 13b. The function of the injectors 13a is to lubricate the toothings and the function of the arms 13b is to lubricate the bearings. The oil is fed to the injector 13a and exits through the end 13c to lubricate the toothings. The oil is also fed to the arm 13b and flows through the feed opening 13d of the bearing. The oil then flows through the axle into one or more buffer areas 10c and out through the orifices 10d in order to lubricate the bearings of the planet gears.

FIG. 3 shows another example of gearbox architecture, referred to as a dual-stage gearing, in which each planet gear 8 comprises two separate toothings 8d1, 8d2 configured to cooperate respectively with the ring gear 9 and the sun gear 7.

In this FIG. 3, the elements already described in the foregoing are designated by the same references.

The toothing 8d1 meshing with the ring gear 9 has a mean diameter noted D2 and is located in a median plane P. The toothing 8d2 meshing with the sun gear 7 has a mean diameter noted D1 and is located in another median plane P'. The median planes P, P' are parallel to each other and perpendicular to the axis X. The diameter D2 is smaller than the diameter D1. Finally, each toothing 8d1, 8d2 comprises a single helix.

As mentioned above, this "dual-stage" architecture generates significant moments at the level of the planet gears 8 in particular because this dual-stage has asymmetrical toothing.

FIGS. 4 and 5 show a gearbox 60 with symmetrical double toothing, which allows to solve the above problem.

This gearbox 60 comprises:
- a sun gear 70 having an axis of rotation X,
- a ring gear 90 which extends around the sun gear and which is configured to be rotationally immobile about the axis X, and
- planet gears 80 which are meshed with the sun gear 70 and the ring gear 90 and which are held by a planet carrier 100 which is configured to be rotatable about the axis X.

The plane H is defined as a median plane perpendicular to the axis X and passing substantially through the middle of the gearbox 60 (FIG. 5).

The sun gear 70 comprises internal splines 70a for coupling with the LP shaft 30 as well as an external toothing 70b for meshing with the planet gears 80. The toothing 70b have two series of adjacent herringbone teeth, separated from each other by a radially outwardly directed annular groove 72. The toothing 70b is symmetrical with respect to the plane H, its teeth being located on either side of the plane H which passes through the groove 72.

The ring gear 90 is formed by two independent annulus 90a, 90b and comprises a toothing which is separated into two series of herringbone teeth 90d1, 90d2 carried respectively by the two annulus.

The annulus 90a, 90b are arranged symmetrically with respect to the plane H which thus extends between these annulus. The annulus are connected and secured to a ring gear carrier 120 by means of annular connecting plates 122. The plates 122 are independent of each other, each plate having a general S-shape in axial half-section providing it with a certain radial flexibility by elastic deformation during operation.

Each annulus 90a, 90b extends around the axis X and is secured to the corresponding plate 122 by its outer periphery. Its inner periphery comprises one of the teeth 90d1, 90d2.

The ring gear carrier 120 has a generally annular shape about the axis X and more particularly is biconical. It thus comprises a first upstream or left-hand segment in the drawing, with an upstream end of smaller diameter, and a downstream end of larger diameter which is connected to the upstream end of larger diameter of the other, downstream or right-hand segment in the drawing. The larger diameter ends of the segments are therefore connected to each other, and their smaller diameter ends form the axial ends of the ring gear carrier.

The upstream end of the ring gear carrier 120 extends around the planet carrier 100 or a shaft connected to the planet carrier, and is centered and rotatably guided on the planet carrier or the shaft by means of at least one bearing 124. Similarly, the downstream end of the ring gear carrier 120 extends around the planet carrier 100 or a shaft connected to the planet carrier, and is centered and rotatably guided on the planet carrier or the shaft by means of at least one further bearing 126.

As in the case of the ring gear 90, the ring gear carrier 120 is symmetrical with respect to the plane H which intersects the ring gear carrier in its middle and thus passes through the ends of the larger diameter of the aforementioned segments.

Each planet gear 80 comprises a first toothing 82 of mean diameter D1 for meshing with the sun gear 70, and a second toothing 84 of mean diameter D2, different from D1 and in particular smaller than D1, for meshing with the ring gear 90. The mean diameters are measured from the axis Y of each planet gear and represent the average between the maximum diameter and the minimum diameter of a toothing of that planet gear.

Each planet gear 80 comprises a cylindrical sleeve 86 and an annular web 88 extending substantially radially outwardly from the middle of this sleeve 86. The toothing 84 is separated into two series of herringbone teeth 84d1, 84d2 which are located respectively on the axial ends of the sleeve 86. The toothing 82 comprises two series of herringbone teeth 82d1, 82d2 which are located at the outer periphery of the web 88 and which are separated from each other by an annular groove 89 opening radially outwards with respect to the axis Y.

The toothing 82 is crossed in its middle by the plane H which passes through the groove 89, the teeth 82d1, 82d2 being thus arranged on either side of the plane H. The teeth 84d1, 84d2 are also arranged symmetrically with respect to the plane H.

The toothing 82 and the outer periphery of the web 88 have an axial dimension which is less than the axial distance between the annulus 90a, 90b and the plates 122, so that each planet gear 80 can rotate freely in the ring gear carrier 120 and between the annulus 90a, 90b and the plates 122.

Each of the planet gears 80 is rotatably guided by a hydrodynamic bearing 81 which comprises a cylindrical body 81a which passes through the planet gear 80, and in particular its sleeve 86, and which is configured to form a guiding oil film inside the planet gear.

The body 81a of a bearing 26 extends along the axis Y and comprises at its longitudinal ends extensions 81b housed in orifices forming seats of the planet carrier 100.

The body 81a is generally tubular and comprises an internal oil flow bore which generally communicates with oil supply conduits to an outer cylindrical surface of the body for forming the oil film between that surface and an inner cylindrical surface of the planet gear 80.

The reduction ratio of a mechanical gearbox can be increased in a small overall dimensions, for example, with the technology shown in FIG. 3 or in FIGS. 4 and 5.

The gearbox comprises all of the characteristics described above in relation to FIGS. 3, 4 and 5 insofar as they do not contradict or conflict with the following.

The references used in FIG. 6 and following and already used in FIGS. 3, 4 and 5 therefore designate identical or similar elements.

FIGS. 6 to 8 illustrate several types of a gearbox 160, which comprises:
  a sun gear 70 which is rotatable about the axis X and which comprises an external toothing 70b,
  a stationary ring gear 90 which extends around the axis X and which carries an internal toothing 90d, this stationary ring gear being configured to be secured to a stator of the turbomachine,
  planet gears 80 which are meshed with the sun gear 70 and the stationary ring gear 90, the planet gears being carried by a planet carrier not shown which is rotatable about the axis X, and
  a movable ring gear 190 which extends about the axis X and which carries an internal toothing 190d, this movable ring gear being independent of the stationary ring gear 90 and being configured to be secured to a rotor of the turbomachine.

Each of the planet gears 80 is meshed with the sun gear 70 and the ring gears 90, 190 and comprises a first external toothing 82 of mean diameter D1, and a second external toothing 84 of mean diameter D2, different from D1. In the example shown, D1 is greater than D2.

The reference 81a refers to the cylindrical body 81a of the hydrodynamic bearing for guiding each planet gear 80, as discussed above.

In FIG. 6, the toothing 84 of diameter D2 of each planet gear 80 is meshed with the toothing 70b of the sun gear 70 and the toothing 190d of the movable ring gear 190. The toothings 70b, 84 and 190d are thus in a same plane P1 perpendicular to the axis X. The toothing 82 of diameter D1 of each planet gear 80 is meshed with the toothing 90d of the stationary ring gear 90.

In FIG. 7, the toothing 82 of diameter D1 of each planet gear 80 is meshed with the toothing 190d of the movable ring gear 190. The toothing 84 of diameter D2 of each planet gear 80 is meshed with the toothing 70b of the sun gear 70 and the toothing 90d of the stationary ring gear 90. The toothings 70b, 84 and 90d are thus in a same plane P1 perpendicular to the axis X.

In FIG. 8, the toothing 82 of diameter D1 of each planet gear 80 is meshed with the toothing 190d of the movable ring gear 190 and with the toothing 70b of the sun gear 70. The toothings 70b, 82 and 190d are thus in a same plane P1 perpendicular to the axis X. The toothing 84 of diameter D2 of each planet gear 80 is meshed with the toothing 90d of the stationary ring gear 90.

In the configurations of FIGS. 6 and 8 where the sun gear 70 and the movable ring gear 190 mesh with the same toothing of the planet gears 80, the (torque) output of the gearbox can be said to be aligned with its input. In the configuration shown in FIG. 7, where the sun gear 70 and the movable ring gear 190 mesh with different toothings of the planet gears 80, the (torque) output of the gearbox can be said to be opposite to its input.

The number of teeth of the movable ring gear 190 may be identical to the number of teeth of the stationary ring gear 90. Alternatively, these numbers are different. The direction of rotation of the movable ring gear 190 may depend on the relative diameter of the two ring gears 90, 190. For example, if the (pitch) diameter of the movable ring gear 190 is greater than that of the stationary ring gear 90, the gearbox 160 is counter-rotating, i.e. the movable ring gear 190 rotates in the opposite direction to the sun gear 70. If the diameter of the movable ring gear 190 is smaller than that of the stationary ring gear 90, the gearbox 160 is co-rotating, i.e. the ring gear 190 and the sun gear 70 rotate in the same direction.

FIG. 9 illustrates partially and more concretely the gearbox 160 of FIG. 8.

The reference 30 refers to the LP shaft, one end of which comprises splines complementary to the splines 70a of the sun gear 70. FIG. 9 allows to see that the planet gears 80 are arranged around the LP shaft 30 or a part of this shaft. This is in particular the case when the stationary ring gear 90 is located downstream of the movable ring gear 190. Since the LP shaft 30 comes from downstream of the turbomachine, it is coupled to the upstream toothing 82 of the planet gears 80 and the toothings 84 of these planet gears are located around the LP shaft 30.

FIG. 10 illustrates partially and more concretely the gearbox 160 of FIG. 7.

The reference 30 also refers to the LP shaft and the reference 100 refers to the planet carrier which carries the cylindrical bodies 81a of the hydrodynamic bearings of the planet gears 80. The downstream LP shaft 30 is here coupled to the downstream toothings 84 of the planet gears 80.

FIG. 11 illustrates partially and more concretely the gearbox 160 of FIG. 8.

The reference 30 also refers to the LP shaft and the reference 100 refers to the planet carrier which carries the cylindrical bodies 81a of the hydrodynamic bearings of the planet gears 80.

Comparing the gearboxes of FIGS. 9 to 11, it can be seen that the axial cluttering requirement of the gearbox 160 can be reduced by arranging the planet gears 80 around at least a part of the LP shaft 30, as is the case in FIGS. 9 and 11.

FIG. 12 shows an example of integration of a gearbox 160 of FIGS. 6 to 11, in an aircraft turbomachine 1.

The LP shaft 3, 30 is coupled to the sun gear 70 of the gearbox 160. The stationary ring gear 90 is secured to a stator element of the turbomachine which is located downstream of the gearbox 160, and which is a stator casing and more precisely the intermediate casing 200 in the example shown, i.e. the casing which is located between the LP 1a and HP 1b compressors and which connects the engine to the fan casing and to the nacelle N of the turbomachine. The connection of the ring gear 90 to the casing 200 is made by a ring gear carrier 208.

The movable ring gear 190 is secured to a rotor of the turbomachine which is the rotor 202 of the fan S in the example shown. This rotor 202 carries the inlet cone 204 of the turbomachine, which is therefore rotationally integral with the fan S.

The planet carrier 100 is free to rotate and comprises, for example, two coaxial annulus 100a, 100b centred on the axis X and connected respectively to the axial ends of the aforementioned cylindrical bodies 81a, as illustrated in FIGS. 10 and 11. The annulus 100a is located upstream of the gearbox 160 and the LP shaft 3, 30, and radially inside the ring gear carrier 206 for connecting the movable ring gear 190 to the fan rotor 202. The annulus 100b is located downstream of the gearbox 160 and extends around the LP shaft 3, 30 and radially inwardly of the ring gear carrier 208.

Reference is now made to embodiments of the invention illustrated in FIGS. 13 to 15, in which each toothings of the sun gear, planet gears and ring gears comprises two annular series of coaxial teeth.

The toothing 70b of the sun gear has two adjacent series of teeth, for example in a herringbone pattern, separated from each other by a radially outwardly directed annular groove 72. The toothing 70b is symmetrical with respect to a plane H perpendicular to the axis, its teeth being located on either side of the plane H which passes through the groove 72.

Each planet gear 80 is of the dual-stage gearing type and comprises a tubular sleeve 86 connected by a web 88 to a first external toothing 82, the sleeve 86 being itself equipped with a second toothing 84.

The first toothing 82 has a mean diameter D1 and meshes with the sun gear 70, and the second toothing 84 has a mean diameter D2, different from D1 and in particular smaller than D1, and meshes with the ring gears 90, 190.

The toothing 84 is separated into two series of teeth 84a, 84b, for example herringbone, which are located respectively on the axial ends of the sleeve 86. The toothing 82 comprises two series of teeth 82a, 82b, for example herringbone, which are located at the external periphery of a web or webs 88 and which are separated from each other by an annular groove 89 opening radially outwards with respect to the axis Y.

The toothing 82 is crossed in the middle by the plane H which passes through the groove 89, the teeth 82a, 82b thus being arranged on either side of the plane H. The teeth 84a, 84b are also arranged symmetrically with respect to the plane H.

The ring gear 90 is formed by two independent half ring gears or annulus 90a, 90b and comprises a toothing which is separated into two series of teeth 90d1, 90d2, for example herringbone, carried respectively by the two annulus. The annulus 90a, 90b are arranged symmetrically with respect to the plane H which thus extends between these annulus.

One of the annulus 90a, located upstream, is connected by a ring gear carrier 120 to the inlet cone 204 of the turbomachine 1. The inlet cone 204 is therefore a stator of the turbomachine 1 in the example shown, in contrast to the example in FIG. 12. The other annulus 90b, located downstream, is connected to the intermediate casing 200 by a ring gear carrier 208.

The ring gear 190 is separated into two half ring gears:
An upstream half ring gear 190a comprising a rim 190aa and an attachment half-flange 190ab. On the rim 190aa is a first series of teeth 190d1 meshed with the series of teeth 82a of each planet gear 80,
A downstream half ring gear 190b comprising a rim 190ba and an attachment half-flange 190bb. On the 190ba rim there is a second series of teeth 190d2 meshed with the series of teeth 82b of each planet gear 80.

The attachment half-flanges 190ab and 190bb form a flange for securing the ring gear 190 to a ring gear carrier 206 which is secured to the rotor 204 of the fan S.

The planet carrier 100 is free to rotate and comprises, for example, two coaxial annulus 100a, 100b centered on the axis X and connected respectively to the axial ends of the aforementioned cylindrical bodies 81a, as illustrated in FIG. 14. The annulus 100a is located upstream of the gearbox 160 and the LP shaft 3, 30, and radially within the ring gear carrier 120 which is itself located within the ring gear carrier 206. The annulus 100b is located downstream of the gearbox 160 and extends around the LP shaft 3, 30 and radially inwardly of the ring gear carrier 208.

The number of teeth of each series of teeth 190d1, 190d2 of the movable ring gear 190 may be identical to the number of teeth of each series of teeth 90d1, 90d2 of the stationary ring gear 90. Alternatively, these numbers are different. The direction of rotation of the movable ring gear 190 is dependent on the ratio of the number of teeth between the two ring gears 90, 190, as mentioned above.

The use of the embodiments shown in FIGS. 13 to 15 with herringbone toothings allows to avoid the axial moments and forces that may occur in the planet gears. In other embodiments, these moments and forces could be taken up by the bearings of the planet gears and by the planet carrier, which would then be sized accordingly.

The invention claimed is:
1. A mechanical gearbox for a turbomachine, in particular for an aircraft, this gearbox comprising:
a sun gear rotatable about a first axis and comprising an external toothing comprising two series of adjacent teeth,
a stationary ring gear which extends around the first axis and which carries an internal toothing comprising two series of teeth, this stationary ring gear being configured to be secured to a stator of the turbomachine, and
planet gears which are in mesh with the sun gear and the stationary ring gear, the planet gears being carried by a planet carrier which is rotatable about the first axis and each of the planet gears having a dual-stage gearing and comprising a first external toothing of mean diameter D1 and comprising two series of adjacent teeth, and a second external toothing of mean diameter D2, different from D1, and comprising two series of teeth, the two series of teeth of the first toothing of each of the planet gears being meshed with the two series of teeth of the toothing of the sun gear, wherein it further comprises:
a movable ring gear which extends about the first axis and which carries an internal toothing with two series of adjacent teeth, this movable ring gear being independent of the stationary ring gear and being configured so as to be secured to a rotor of the turbomachine, each of the planet gears being meshed with the sun gear and the stationary and movable ring gears,
wherein the series of teeth are arranged symmetrically with respect to a median plane perpendicular to the first axis,
wherein the movable ring gear comprises two half ring gears secured to each other and respectively carrying the two series of teeth, these two series of teeth being meshed with the two series of teeth of the first toothing of each of the planet gears and the stationary ring gear comprising two annulus disposed on each side of the movable ring gear and respectively carrying the two series of teeth, these two series of teeth being meshed with the two series of teeth of the second toothing of each of the planet gears, and
wherein said planet carrier comprises two coaxial annulus which are centered to said first axis and which are connected respectively to axial ends of said planet gears so that said dual-stage gearing is interposed between said two coaxial annulus, each of said planet gears being rotatable relative to said planet carrier about a second axis which is parallel to said first axis.

2. The mechanical gearbox according to claim 1, wherein each of the planet gears is meshed by its first toothing with the toothing of the sun gear and the toothing of the movable ring gear, and by its second toothing with the toothing of the stationary ring gear.

3. The mechanical gearbox according to claim 1, wherein the sun gear is coupled to a shaft or integral with a shaft, the planet gears being arrangeable around at least a part of this shaft.

4. The mechanical gearbox according to claim 1, wherein the toothing of the stationary and movable ring gears have a same number of teeth.

5. The mechanical gearbox according to claim 1, wherein the toothing of the stationary and movable ring gears have different numbers of teeth.

6. The mechanical gearbox according to claim 1, wherein all the toothings are selected from straight, helical or herringbone toothings.

7. The mechanical gearbox according to claim 1, wherein the diameter D2 of the second toothing is smaller than the diameter D1 of the first toothing.

8. A turbomachine, in particular for an aircraft, comprising a mechanical gearbox according to claim 1.

9. The turbomachine according to claim 8, wherein the stationary ring gear is secured to at least one stator element, and/or the movable ring gear is secured to a fan rotor, and/or the planet carrier is mounted to rotate freely.

10. The turbomachine according to claim 8, wherein one of the annulus of the stationary ring gear is secured to a stator element located downstream of the gearbox, said stator element being an intermediate stator casing, and the other of the annulus of the stationary ring gear is secured to a stator element located upstream of the gearbox, said stator element being an air inlet cone.

11. The turbomachine according to claim 1, wherein the movable ring gear comprises two half ring gears which are formed by independent parts secured to each other and respectively carrying the two series of teeth.

12. The turbomachine according to claim 1, wherein each of the planet gears is rotatably guided by a hydrodynamic bearing which comprises a cylindrical body which passes through the planet gear and which is configured to form a guiding oil film inside the planet gear, said cylindrical body being connected to said two coaxial annulus.

* * * * *